United States Patent
Cherian et al.

(10) Patent No.: US 9,615,316 B2
(45) Date of Patent: Apr. 4, 2017

(54) METHODS AND DEVICES FOR FACILITATING MODIFIED CELL RESELECTION PARAMETERS AND PROCEDURES WHEN ACCESS TERMINALS EXHIBIT LITTLE OR NO MOBILITY

(71) Applicant: Qualcomm Incorporated, San Diego, CA (US)

(72) Inventors: George Cherian, San Diego, CA (US); Jun Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 465 days.

(21) Appl. No.: 13/648,070

(22) Filed: Oct. 9, 2012

(65) Prior Publication Data

US 2013/0130689 A1 May 23, 2013

Related U.S. Application Data

(60) Provisional application No. 61/561,638, filed on Nov. 18, 2011.

(51) Int. Cl.
*H04W 48/16* (2009.01)
*H04W 52/28* (2009.01)
(Continued)

(52) U.S. Cl.
CPC ....... *H04W 48/16* (2013.01); *H04W 36/0083* (2013.01); *H04W 52/228* (2013.01);
(Continued)

(58) Field of Classification Search
CPC ............. H04W 48/16; H04W 36/0083; H04W 52/228; H04W 52/285; H04W 36/08;
(Continued)

(56) References Cited

U.S. PATENT DOCUMENTS

| 5,430,760 A | 7/1995 | Dent |
| 5,544,196 A | 8/1996 | Tiedemann, Jr. et al. |

(Continued)

FOREIGN PATENT DOCUMENTS

| EP | 2469942 A1 | 6/2012 |
| EP | 2521397 A1 | 11/2012 |

(Continued)

OTHER PUBLICATIONS

International Search Report and Written Opinion—PCT/US2012/065729—ISA/EPO—Mar. 15, 2013.

*Primary Examiner* — Mehmood B Khan
(74) *Attorney, Agent, or Firm* — Darren M. Simon

(57) ABSTRACT

Access terminals are adapted to facilitate use of modified cell reselection parameters and/or procedures for access terminals exhibiting low or no mobility. An access terminal may employ one or more mobile thresholds to determine whether to perform cell reselection when the access terminal is mobile, and one or more stationary threshold to determine whether to perform cell reselection when the access terminal is stationary or substantially stationary. Methods operational on access terminals include determining the access terminal to be stationary or substantially stationary, and employing one or more stationary thresholds to determine whether to perform a cell reselection when the access terminal is determined to be at least substantially stationary. Other aspects, embodiments, and features are also included.

22 Claims, 5 Drawing Sheets

(51) Int. Cl.
*H04W 36/00* (2009.01)
*H04W 52/10* (2009.01)
*H04W 52/22* (2009.01)
*H04W 52/50* (2009.01)
*H04W 48/20* (2009.01)
*H04W 36/08* (2009.01)
*H04W 36/32* (2009.01)

(52) U.S. Cl.
CPC .......... *H04W 52/285* (2013.01); *H04W 36/08* (2013.01); *H04W 36/32* (2013.01); *H04W 48/20* (2013.01); *H04W 52/10* (2013.01); *H04W 52/225* (2013.01); *H04W 52/50* (2013.01)

(58) Field of Classification Search
CPC ..... H04W 36/32; H04W 48/20; H04W 52/10; H04W 52/225; H04W 52/50
USPC ........................... 455/436–444; 370/328–334
See application file for complete search history.

(56) References Cited

U.S. PATENT DOCUMENTS

| | | | |
|---|---|---|---|
| 5,940,743 A | 8/1999 | Sunay et al. | |
| 6,067,460 A * | 5/2000 | Alanara | H04W 52/0245 455/161.3 |
| 6,101,179 A | 8/2000 | Soliman | |
| 6,118,997 A | 9/2000 | Kim et al. | |
| 6,292,519 B1 | 9/2001 | Popovic | |
| 6,498,785 B1 | 12/2002 | Derryberry et al. | |
| 6,615,050 B1 | 9/2003 | Tiedemann, Jr. et al. | |
| 6,674,739 B1 | 1/2004 | Lee et al. | |
| 6,845,245 B2 | 1/2005 | Hunzinger | |
| 6,871,078 B2 | 3/2005 | Nishioka et al. | |
| 6,937,641 B2 | 8/2005 | Li et al. | |
| 6,950,417 B2 | 9/2005 | Soliman | |
| 6,952,411 B2 | 10/2005 | Sinnarajah et al. | |
| 6,985,728 B2 | 1/2006 | Tiedemann et al. | |
| 6,987,982 B2 | 1/2006 | Willenegger et al. | |
| 7,024,217 B2 | 4/2006 | Hunzinger | |
| 7,190,688 B1 | 3/2007 | Kamel et al. | |
| 7,228,134 B2 | 6/2007 | Gandhi et al. | |
| 7,239,884 B2 | 7/2007 | Khawand et al. | |
| RE40,253 E | 4/2008 | Kim et al. | |
| 7,433,331 B2 | 10/2008 | Welnick et al. | |
| 7,630,719 B2 | 12/2009 | Bender et al. | |
| 7,636,322 B1 | 12/2009 | Gandhi et al. | |
| 8,194,562 B1 | 6/2012 | Gandhi et al. | |
| 8,208,855 B2 * | 6/2012 | Lee | H04L 27/2608 455/63.1 |
| 8,284,793 B2 | 10/2012 | Santhanam et al. | |
| 8,320,318 B2 | 11/2012 | Baker et al. | |
| 8,391,412 B1 | 3/2013 | Oroskar et al. | |
| 8,457,633 B1 * | 6/2013 | Oroskar | H04W 28/16 455/428 |
| 8,515,441 B1 * | 8/2013 | Oroskar | H04W 72/042 370/394 |
| 8,526,990 B1 | 9/2013 | Pulugurta | |
| RE44,530 E | 10/2013 | Kim et al. | |
| 8,626,224 B1 | 1/2014 | Vargantwar et al. | |
| 8,626,228 B1 | 1/2014 | Pulugurta | |
| 8,743,809 B2 | 6/2014 | Vashi et al. | |
| 9,025,572 B2 | 5/2015 | Wang et al. | |
| 9,241,298 B2 | 1/2016 | Cherian et al. | |
| 2001/0006514 A1 * | 7/2001 | Park | H04W 36/12 370/331 |
| 2002/0085513 A1 | 7/2002 | Moon | |
| 2002/0183086 A1 | 12/2002 | Hellmark et al. | |
| 2003/0148765 A1 * | 8/2003 | Ma | H04W 36/32 455/438 |
| 2005/0227721 A1 | 10/2005 | Nakao | |
| 2005/0233700 A1 * | 10/2005 | Pecen | H04W 88/06 455/67.11 |
| 2006/0014557 A1 | 1/2006 | Rajkotia et al. | |
| 2006/0092875 A1 * | 5/2006 | Yang | H04W 52/42 370/329 |
| 2006/0148490 A1 * | 7/2006 | Bates | H04W 48/02 455/456.1 |
| 2007/0099645 A1 | 5/2007 | Kim | |
| 2007/0178929 A1 | 8/2007 | Kim | |
| 2007/0211787 A1 * | 9/2007 | Harris | H04J 13/16 375/141 |
| 2007/0287476 A1 * | 12/2007 | Jeong | H04W 76/02 455/456.6 |
| 2008/0004023 A1 * | 1/2008 | Chen | H04W 52/0229 455/436 |
| 2008/0220784 A1 * | 9/2008 | Somasundaram | H04W 36/0083 455/437 |
| 2008/0225801 A1 * | 9/2008 | Turk | H04W 36/32 370/332 |
| 2008/0232304 A1 | 9/2008 | Mooney et al. | |
| 2009/0141838 A1 * | 6/2009 | Han | H04W 36/06 375/344 |
| 2009/0170437 A1 * | 7/2009 | Bhattad | H04L 1/0026 455/63.1 |
| 2009/0291688 A1 | 11/2009 | Uehara et al. | |
| 2010/0039316 A1 * | 2/2010 | Gronemeyer | G01S 19/34 342/357.48 |
| 2010/0081455 A1 * | 4/2010 | Teasdale | H04W 60/04 455/456.1 |
| 2010/0091714 A1 * | 4/2010 | Bennett | H04N 21/4126 370/328 |
| 2010/0142504 A1 * | 6/2010 | Bitran | H04W 88/06 370/338 |
| 2010/0222055 A1 * | 9/2010 | Cho | H04J 11/0086 455/434 |
| 2010/0226267 A1 | 9/2010 | Jang et al. | |
| 2010/0290408 A1 | 11/2010 | Steudle et al. | |
| 2010/0317350 A1 * | 12/2010 | Lee | H04W 36/0016 455/442 |
| 2011/0026484 A1 | 2/2011 | Fox et al. | |
| 2011/0059741 A1 * | 3/2011 | Klein | H04W 36/30 455/436 |
| 2011/0117954 A1 * | 5/2011 | Iwamura | H04W 36/0094 455/525 |
| 2011/0124330 A1 * | 5/2011 | Kojima | H04W 36/32 455/424 |
| 2011/0130141 A1 | 6/2011 | Frost et al. | |
| 2011/0141006 A1 * | 6/2011 | Rabu | G01C 21/20 345/156 |
| 2011/0269447 A1 * | 11/2011 | Bienas | H04W 8/22 455/422.1 |
| 2011/0319080 A1 | 12/2011 | Bienas et al. | |
| 2012/0307927 A1 * | 12/2012 | Nammi | H04B 17/27 375/267 |
| 2012/0315890 A1 * | 12/2012 | Suzuki | H04W 24/10 455/422.1 |
| 2013/0065590 A1 | 3/2013 | Jang et al. | |
| 2013/0084842 A1 * | 4/2013 | Laitinen | H04W 36/32 455/418 |
| 2013/0089079 A1 | 4/2013 | Amirijoo et al. | |
| 2013/0130738 A1 | 5/2013 | Cherian et al. | |
| 2013/0150054 A1 * | 6/2013 | Axmon | H04W 36/32 455/440 |
| 2013/0188503 A1 * | 7/2013 | Anepu | H04W 24/10 370/252 |
| 2013/0188562 A1 | 7/2013 | Espina et al. | |
| 2013/0308579 A1 | 11/2013 | Pulugurta | |

FOREIGN PATENT DOCUMENTS

| | | |
|---|---|---|
| JP | 2005064949 A | 3/2005 |
| JP | 2005269118 A | 9/2005 |
| JP | 2006352883 A | 12/2006 |
| JP | 2007097055 A | 4/2007 |
| JP | 2008048233 A | 2/2008 |
| JP | 2008148136 A | 6/2008 |
| JP | 2008211599 A | 9/2008 |
| JP | 2009027459 A | 2/2009 |
| JP | 2010087952 A | 4/2010 |

(56) References Cited

FOREIGN PATENT DOCUMENTS

| | | | |
|---|---|---|---|
| KR | 20100016494 | A | 2/2010 |
| WO | 0203719 | A2 | 1/2002 |
| WO | 02099996 | A1 | 12/2002 |
| WO | 2007088381 | A1 | 8/2007 |
| WO | 2008115786 | A1 | 9/2008 |
| WO | 2010138601 | A2 | 12/2010 |

* cited by examiner

METHODS AND DEVICES FOR FACILITATING MODIFIED CELL RESELECTION PARAMETERS AND PROCEDURES WHEN ACCESS TERMINALS EXHIBIT LITTLE OR NO MOBILITY

CROSS REFERENCE TO RELATED APPLICATION & PRIORITY CLAIM

The present Application for Patent claims priority to Provisional Application No. 61/561,638 entitled "METHODS AND DEVICES FOR FACILITATING POWER CONSERVATION AND NETWORK OPTIMIZATIONS WHEN ACCESS TERMINALS EXHIBIT LITTLE OR NO MOBILITY" filed Nov. 18, 2011, and assigned to the assignee hereof and hereby expressly incorporated by reference herein.

TECHNICAL FIELD

Embodiments of the present invention relate generally to wireless communications, and more specifically, to methods and devices for facilitating modified cell reselection parameters and/or procedures for access terminals exhibiting low or no mobility.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of access terminals are adapted to utilize such wireless communications systems. Often access terminals are adapted for mobility, such that the access terminal can move throughout a geographic region while maintaining access to the wireless communications system. Other access terminals may experience little to no change in location. Some examples of access terminals that experience little to no change in location include machine-to-machine (M2M) access terminals. A M2M adapted access terminal may include an access terminal that is adapted to operate at least substantially without user interaction.

BRIEF SUMMARY OF SOME EXAMPLES

Various types of access terminals often operate on a limited power source, such as a battery. Accordingly, features may be desirable to improve the life of these limited power sources. Various examples and implementations of the present disclosure facilitate power conservation by optimizing one or more cell reselection features. One or more aspects of the present disclosure include access terminals adapted to facilitate modified cell reselection parameters and/or procedures. In at least one example, such access terminals may include a communications interface and a storage medium, each coupled to a processing circuit. When the access terminal is mobile, the processing circuit can be adapted to employ one or more mobile thresholds to determine whether to perform cell reselection. When the access terminal is at least substantially stationary, the processing circuit may employ one or more stationary thresholds to determine whether to perform cell reselection. Such stationary thresholds may include a reduced threshold value for a level of signal quality associated with a serving cell that will trigger signal measurements of one or more other cells for cell reselection, and/or an increased threshold value for an amount by which a quality of a new cell is to be better than a quality of a serving cell before a reselection to the new cell is performed.

Additional aspects of the present disclosure include methods operational on an access terminal and/or access terminals including means for performing such methods. One or more examples of such methods may include determining the access terminal to be at least substantially stationary. In response to this determination, one or more stationary thresholds may be employed to determine whether to perform a cell reselection. The one or more stationary thresholds may include a reduced threshold value for a level of signal quality associated with a serving cell that will trigger signal measurements of one or more other cells for cell reselection, and/or an increased threshold value for an amount by which a quality of a new cell is to be better than a quality of a serving cell before a reselection to the new cell is performed.

Further aspects of the present disclosure include processor-readable mediums including programming operational on an access terminal. According to one or more examples, such programming may cause a processor to employ one or more mobile thresholds to determine whether to perform cell reselection when the access terminal is mobile. The programming may further cause the processor to employ one or more stationary threshold to determine whether to perform cell reselection when the access terminal is at least substantially stationary. The one or more stationary thresholds may include a reduced threshold value for a level of signal quality associated with a serving cell that will trigger signal measurements of one or more other cells for cell reselection, and/or an increased threshold value for an amount by which a quality of a new cell is to be better than a quality of a serving cell before a reselection to the new cell is performed.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

In the following description, certain terminology is used to describe certain features of one or more examples. The term "access terminal" as used herein is meant to be interpreted broadly. For example, an "access terminal" refers generally to one or more devices that communicate with one or more other devices through wireless signals. Such access terminals may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. Access terminals may include mobile terminals and/or at least substantially stationary terminals. Examples of access terminals include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

The various concepts presented throughout this disclosure may be implemented across a broad variety of telecommunication systems, network architectures, and communication standards. Certain aspects of the disclosure are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

Figure 1:
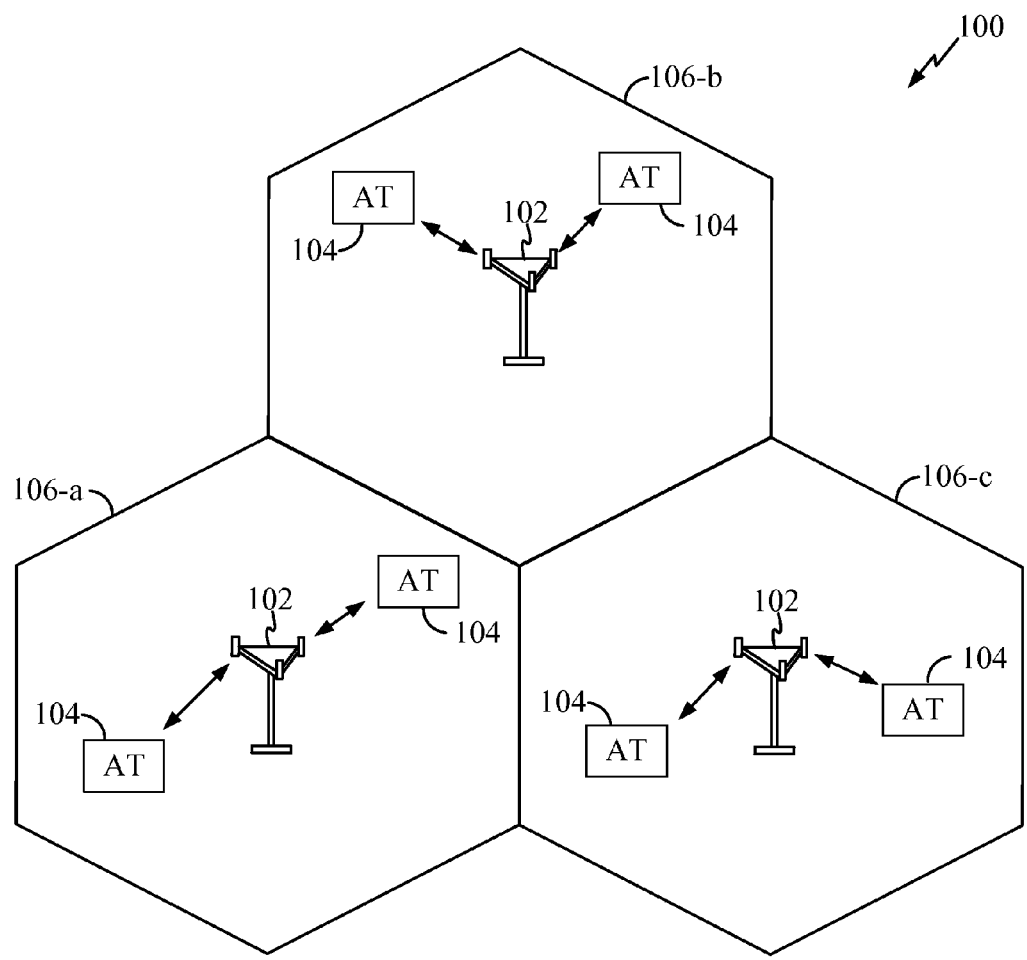
FIG. 1 is a block diagram of a network environment in which one or more aspects of the present disclosure may find application.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, and/or pico base stations).

Figure 2:
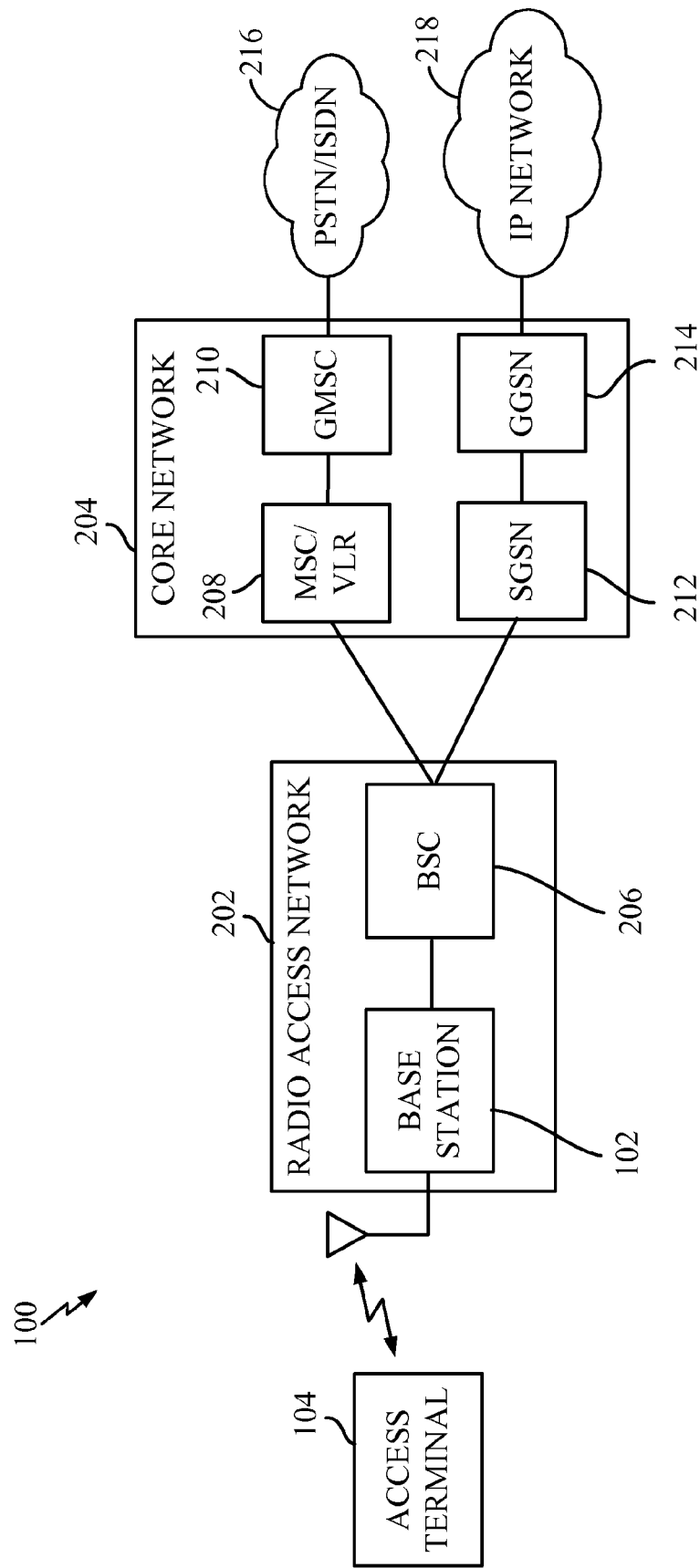
FIG. 2 is a block diagram illustrating select components of the wireless communication system of FIG. 1 according to at least one example.

The access terminals 104 may be dispersed throughout the coverage areas 106. Each access terminal 104 may communicate with one or more base station 102. FIG. 2 is a block diagram illustrating select components of the wireless communication system 100 according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may also be referred to by those skill in the art as a base station subsystem (BSS), an access network, a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Referring again to FIG. 1, as an access terminal 104 operates within the wireless communications system 100, the access terminal 104 can connect to the network (e.g., upon powering up) and search for a suitable cell 106 (e.g., 106-a, 106-b, 106-c). On location of a suitable cell (e.g., cell 106-*a*), the access terminal 104 can perform registration with the base station 102 associated with the cell (e.g., the base station 102 in cell 106-*a*). The access terminal 104 may "camp" on the cell (e.g., cell 106-*a*) if the access terminal 104 is in an idle mode and not actively communicating with the cell (e.g., cell 106-*a*). Being camped on a particular cell may include an access terminal 104 being tuned to the cell's control channels to receive paging and broadcast signals therefrom. The cell on which the access terminal 104 is camped may be referred to as the serving cell.

While camped on the serving cell (e.g., cell 106-*a*), the access terminal 104 may periodically search for better cells (e.g., cell 106-*b* or 106-*c*) to ensure the access terminal 104 is camped on the most appropriate cell of the network. If a better cell (e.g., cell 106-*b* or 106-*c*) is found, then the access terminal 104 may select the better cell as a new serving cell via a process commonly referred to as cell reselection.

Cell reselection may be based on a general search of all possible base station channels, or it may be aided by reference to a stored list of cells and/or cell signal strength measurements made while the access terminal 104 was in dedicated mode. The access terminal 104 can monitor the signal received from the current cell on which it is camped, as well as the signals from one or more neighboring cells. A cell change may be indicated, for example, if the signal from one of the neighboring cells is sufficiently stronger than that of the current cell, and/or if cell reselection is invoked by network conditions and priorities.

The searches performed in the idle mode may enable the access terminal 104 to camp on the best possible cell even if channel conditions change. By finding and camping on the best possible cell, the access terminal 104 can reliably receive incoming paging messages and reliably initiate or receive calls. Accordingly, the searches for better cells while in the idle mode, as well as reselection to a new cell may be beneficial in many instances. The search for better cells and reselection to a new cell also consumes battery power, which may shorten standby time of the access terminal 104 in the idle mode.

In some instances, one or more of the access terminals 104 may be stationary or substantially stationary such that the channel conditions are less likely to change in a meaningful way. One example of such stationary or substantially stationary access terminals 104 includes machine-to-machine (M2M) enabled access terminals 104. M2M enabled access terminals 104 are adapted to wirelessly communicate with one or more devices over the wireless communication system 100, at least substantially without user interaction. M2M access terminals 104 may comprise a communications device adapted to capture an event (e.g., a sensor that captures temperature, a meter to capture inventory level, etc.), which is relayed through the wireless communication system 100 to an application (e.g., software program), where the event data can be translated into meaningful information (e.g., temperature needs to be lowered/raised, items need to be restocked, etc.). By way of example and not limitation, an M2M access terminal 104 may include a thermostat, a water meter, a sprinkler system, a smart-meter, an appliance, etc.

An access terminal 104 that is stationary or substantially stationary may generally retain similar signal parameters between one or more particular base stations 102. As a result, the channel conditions are less likely to change in a meaningful way, and searches for better cells are less likely to result in a cell reselection. In addition, a cell reselection may be less beneficial. In some instances, when a cell reselection is performed, the stationary or substantially stationary access terminal 104 may end up reselecting back and forth between the currently serving cell and the new cell.

Figure 3:
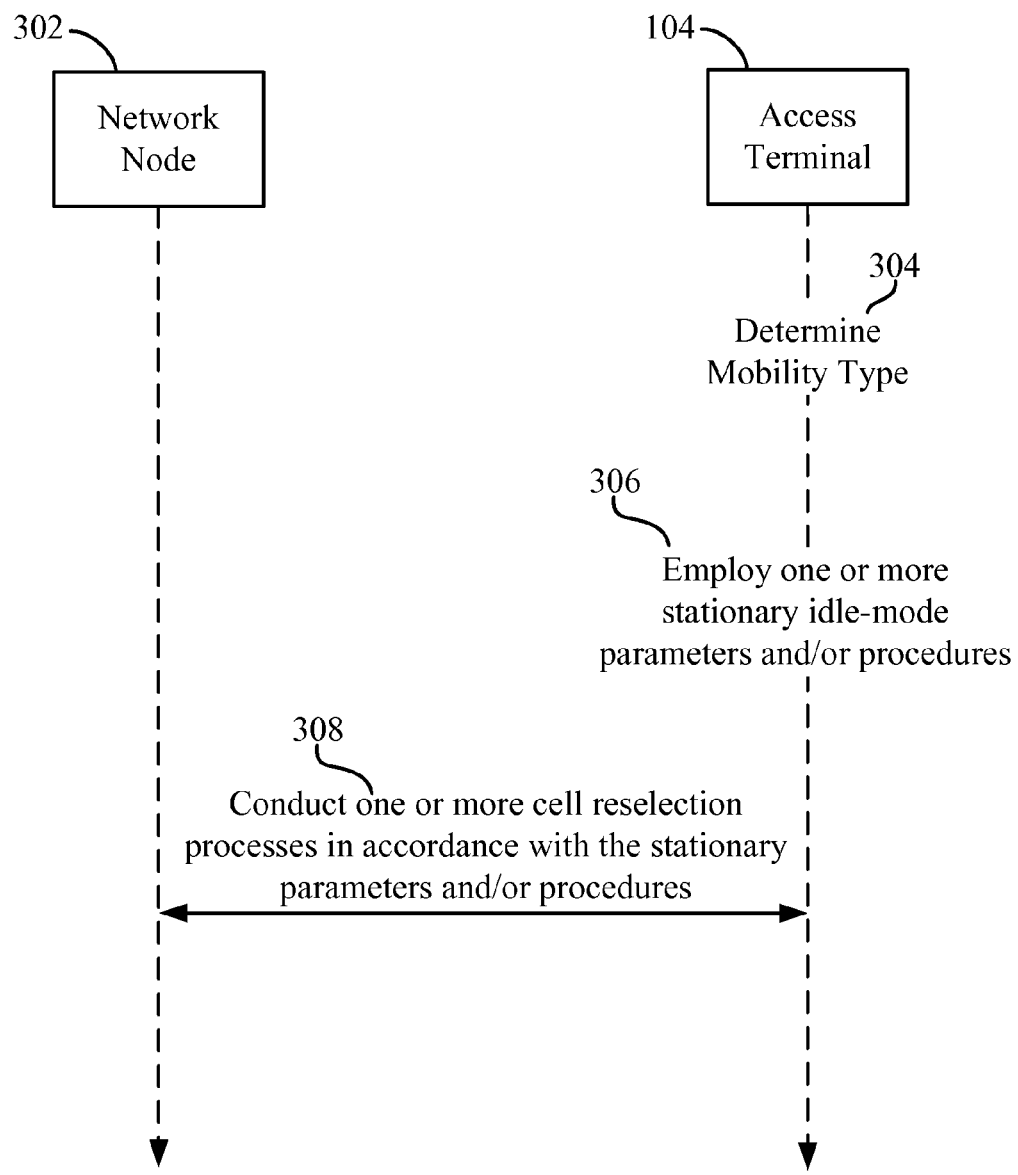
FIG. 3 is a flow diagram illustrating an example for facilitating adjustments to idle-mode cell reselection parameters and/or procedures according to some embodiments.

According to at least one feature, access terminals 104 of the present disclosure may be adapted to employ one or more idle-mode cell reselection parameters and/or procedures optimized for stationary access terminals to reduce the frequency and/or likelihood of conducting such cell reselection procedures. FIG. 3 is a flow diagram illustrating an example for facilitating adjustments to idle-mode cell reselection parameters and/or procedures. An access terminal 104 and a network node 302 are illustrated. The network node 302 may represent one or more network elements, such as a base station 102, a base station controller 206, and/or a MSC/VLR 208, which are illustrated in FIGS. 1 and 2. Initially, the access terminal 104 may determine that its mobility type 304 is stationary or substantially stationary. This determination of a stationary or substantially stationary mobility type can indicate to the access terminal 104 that it may employ one or more stationary cell reselection parameters and/or procedures instead of one or more conventional (or mobile) cell reselection parameters and/or procedures.

Upon determining that the access terminal 104 is at least substantially stationary (i.e., has a stationary mobility type), the access terminal 104 can employ one or more stationary idle-mode parameters and/or procedures 306. For example, the access terminal 104 may employ one or more stationary thresholds for determining that a cell reselection from the serving cell to a new cell should be conducted. Another example may include employing a modified idle-mode cell reselection procedure so that a cell reselection search of all possible base station channels is conducted less frequently. Yet another example may include reducing the frequency at which the access terminal 104 evaluates the quality of the serving cell.

With the one or more stationary idle-mode parameters and/or procedures, the access terminal 104 may monitor one or more signal parameters from the network node 302 according to the stationary thresholds to determine whether a cell reselection should be implemented and/or the access terminal 104 may communicate with the network node 302 to conduct one or more cell reselection processes 308 in accordance with the stationary reselection procedures. The stationary idle mode cell reselection parameters and/or procedures can facilitate a reduction in power consumption by the access terminal 104, extending the life of the power source.

Figure 4:
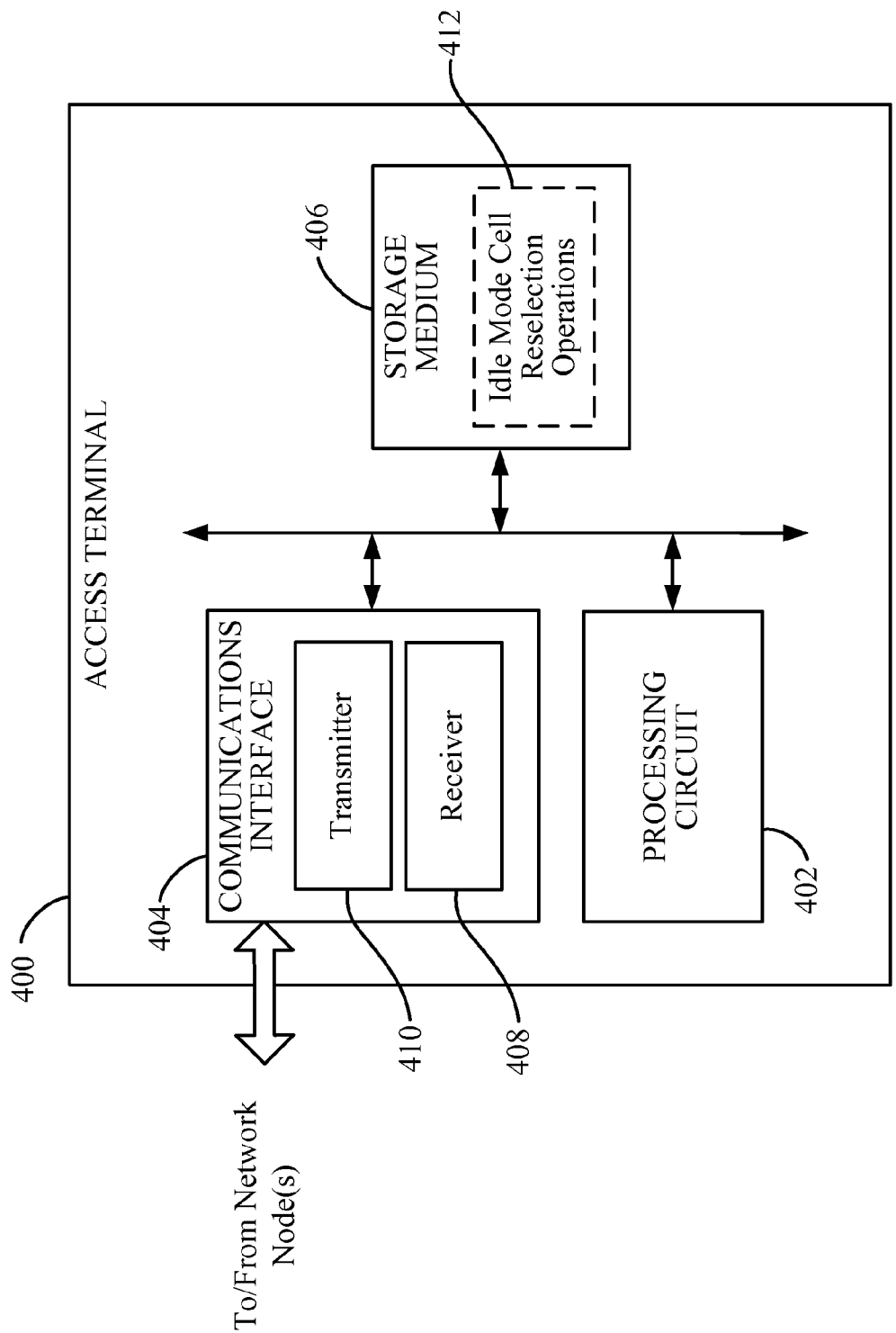
FIG. 4 is a block diagram illustrating select components of an access terminal according to at least one example.

FIG. 4 is a block diagram illustrating select components of an access terminal 400 according to at least one implementation. The access terminal 400 may include a processing circuit 402 coupled to or placed in electrical communication with a communications interface 404 and a storage medium 406.

The processing circuit 402 is arranged to obtain, process and/or send data, control data access and storage, issue commands, and control other desired operations. The processing circuit 402 may include circuitry configured to implement desired programming provided by appropriate media in at least one example. For example, the processing circuit 402 may be implemented as one or more processors, one or more controllers, and/or other structure configured to execute executable programming Examples of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 402 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 402 are for illustration and other suitable configurations within the scope of the present disclosure are also contemplated.

The processing circuit 402 is adapted for processing, including the execution of programming, which may be stored on the storage medium 406. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 404 is configured to facilitate wireless communications of the access terminal 400. For example, the communications interface 404 may include circuitry and/or programming adapted to facilitate the communication of information bi-directionally with respect to one or more wireless network devices (e.g., network nodes). The communications interface 404 may be coupled to one or more antennas (not shown), and includes wireless transceiver circuitry, including at least one receiver circuit 408 (e.g., one or more receiver chains) and/or at least one transmitter circuit 410 (e.g., one or more transmitter chains).

The storage medium 406 may represent one or more devices for storing programming and/or data, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor. By way of example and not limitation, the storage medium 406 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the access terminal 400, external to the access terminal 400, distributed across multiple entities).

Programming stored by the storage medium 406, when executed by the processing circuit 402, causes the processing circuit 402 to perform one or more of the various functions and/or process steps described herein. For example, the storage medium 406 may include idle mode cell reselection operations 412 adapted to cause the processing circuit 402 to employ one or more stationary idle-mode cell reselection parameters and/or procedures when the access terminal 400 is at least substantially stationary. The idle mode cell reselection operations 412 may further be adapted to cause the processing circuit 402 to employ one or more mobile idle-mode cell reselection parameters and/or procedures when the access terminal 400 is mobile. Thus, according to one or more aspects of the present disclosure, the processing circuit 402 is adapted to perform (in conjunction with the storage medium 406) any or all of the processes, functions, steps and/or routines for any or all of the access terminals (e.g., access terminal 102) described herein. As used herein, the term "adapted" in relation to the processing circuit 402 may refer to the processing circuit 402 being one or more of configured, employed, implemented, and/or programmed to perform a particular process, function, step and/or routine according to various features described herein.

Figure 5:
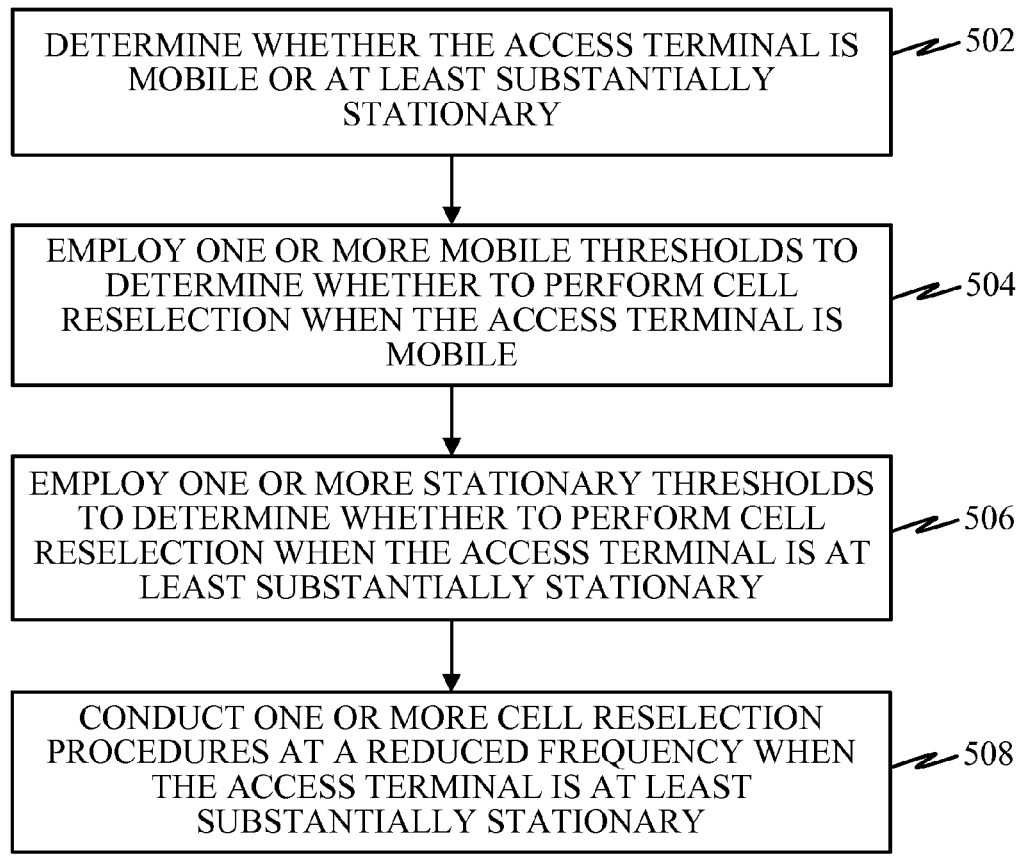
FIG. 5 is a flow diagram illustrating a method operational on an access terminal according to at least one example.

FIG. 5 is a flow diagram illustrating at least one example of a method operational on an access terminal, such as the access terminal 400. Referring to FIGS. 4 and 5, the access terminal 400 may determine the access terminal to be at least substantially stationary at step 502. For example, the processing circuit 402 executing the idle mode cell reselection operations 412 may determine whether the access terminal 400 is mobile or at least substantially stationary.

In some implementations, this determination may include the processing circuit 402 accessing pre-provisioned data (or pre-configured information) stored in the storage medium 406 and adapted to define a mobility type. The mobility type can indicate whether the access terminal 400 is mobile or at least substantially stationary.

In some implementations, the processing circuit 402 executing the idle mode cell reselection operations 412 may determine how often cell reselection procedures have been conducted. The processing circuit 402 may also take into account whether previous cell reselections have been between a common group of the same cells (e.g., whether the access terminal 400 has only changed between the same two or three cells). According to various examples, the processing circuit 402 executing the idle mode cell reselection operations 412 can determine the access terminal 400 is stationary or substantially stationary when there have been no cell reselections over the course of a predetermined period of time (e.g., a couple of days, a week, a month, etc.), and/or when the previous cell reselection are limited to reselections between a common group of the same cells.

In some implementations, the processing circuit 402 executing the idle mode cell reselection operations 412 may monitor a relative pilot signal strength of each of the neighboring cell. When the relative signal strength of one or more neighboring cells remains at least substantially the same for a predetermined duration of time (e.g., the difference in signal strength from one measurement to the next is less than some predefined threshold), the processing circuit 402 executing the idle mode cell reselection operations 412 may conclude that the access terminal 400 is at least substantially stationary.

In some implementations, the processing circuit 402 executing the idle mode cell reselection operations 412 may monitor a GPS location (e.g., via a GPS device (not shown) of the access terminal 400) to determine whether the access terminal 400 is mobile or at least substantially stationary.

For example, the processing circuit 402 may monitor a GPS location at some predetermined frequency. When any change in GPS location is less than a predefined threshold, the processing circuit 402 executing the idle mode cell reselection operations 412 may determine that the access terminal 400 is at least substantially stationary. Although various examples are described for determining the mobility of the access terminal 400, other examples may also be employed, as well as various combinations of two or more examples.

If the access terminal 400 is determined to be mobile, then the access terminal 400 can employ conventional (or mobile) thresholds to determine whether to perform a cell reselection at step 504. For example, the processing circuit 402 may employ the conventional (or mobile) thresholds for determining whether to perform a cell reselection. The conventional (or mobile) thresholds can represent thresholds that are implemented in conventional devices, without regard to a mobility type.

At step 506, the access terminal 400 can employ one or more stationary thresholds to determine whether to perform a cell reselection when the access terminal 400 is determined to be stationary or substantially stationary (e.g., has a stationary mobility type). For example, the processing circuit 402 executing the idle mode cell reselection operations 412 may employ one or more stationary thresholds for determining whether to perform a cell reselection. The stationary thresholds may be implemented as a substitute for the conventional (or mobile) thresholds for determining whether to perform a cell reselection. That is, when the access terminal 400 is determined to be at least substantially stationary, then the processing circuit 402 may employ the stationary thresholds instead of the conventional thresholds for determining whether to conduct cell reselection. Compared to the conventional thresholds, the stationary thresholds can be adapted to reduce cell reselections in stationary or substantially stationary access terminals.

An example of a threshold includes a level of signal quality associated with the serving cell that will trigger signal measurements of one or more other cells for cell reselection. When the access terminal 400 is camped on a serving cell in idle mode, the processing circuit 402 may monitor and measure signal quality for one or more channels (e.g., a paging channel (PCH)) of the serving cell. The processing circuit 402 may be adapted to trigger intra-frequency measurements and evaluate cell reselection criterion when a measured signal quality associated with the serving cell is equal to or below a predefined threshold. The signal quality may include a measurement of a signal-to-noise ratio of a common pilot from the serving cell.

According to at least one aspect, the threshold value for the level of signal quality that would trigger the measurements process can be reduced. For example, the processing circuit 402 executing the idle mode cell reselection operations 412 may employ a reduced threshold value (compared to the conventional threshold) for the measured signal quality of the serving cell that will trigger the signal measurements and evaluation of cell reselection criterion. That is, the value for signal quality of the serving cell that will trigger cell reselection measurements when the access terminal 400 is stationary or substantially stationary can be a lower value than the value employed for signal quality when the access terminal 400 is mobile. By way of illustration and not limitation, a common pilot signal-to-noise ratio value of 3 or lower may trigger cell reselection measurements when the access terminal 400 is stationary or substantially stationary, while a common pilot signal-to-noise ratio of 5 or lower may trigger cell reselection measurements when the access terminal 400 is mobile. By employing a reduced threshold value for the level of signal quality that will trigger the measurements process, the access terminal 400 may perform fewer signal measurements and evaluation of cell reselection criterion when stationary or substantially stationary compared to when the access terminal 400 is mobile.

Another example of a threshold includes an amount by which a level of signal quality that a new cell is better than the serving cell before cell reselection to the new cell is performed. After the processing circuit 402 has performed signal measurements of one or more other cells for cell reselection, the processing circuit 402 is adapted to compare the measured signal quality for a new cell with the signal quality of the serving cell. Typically, the cell reselection criterion is such that the processing circuit 402 will reselect to the new cell if the signal quality associated with the new cell is some predetermined amount better than the signal quality associated with the serving cell.

According to at least one aspect, the threshold value defining the amount by which the signal quality associated with the new cell is to be better than the signal quality associated with the serving cell can be increased. For example, the processing circuit 402 executing the idle mode cell reselection operations 412 may employ an increase threshold value (compared to the conventional threshold value) for the amount by which the quality of the new cell is to be better than the quality of the serving cell before the processing circuit 402 will reselect to the new cell. That is, the amount by which the signal quality of the new cell is better than the signal quality of the serving cell before a reselection is performed can be a larger value when the access terminal is stationary or substantially stationary compared to the value employed when the access terminal 400 is mobile. By way of illustration and not limitation, a cell reselection to a new cell may be performed when the signal strength associated with the new cell is at least 9 decibels (dB) higher than the signal strength associated with the serving cell when the access terminal 400 is at least substantially stationary, and at least 5 dB higher when the access terminal 400 is mobile. By employing an increased threshold value for the level of signal quality that the new cell is better than the signal quality of the serving cell, the access terminal 400 may perform fewer reselections to a new cell when stationary or substantially stationary compared to when the access terminal 400 is mobile.

At step 508, the access terminal 400 may further conduct one or more cell reselection procedures at a reduced frequency compared to a conventional frequency when the access terminal 400 is determined to be at least substantially stationary. For example, the processing circuit 402 executing the idle mode cell reselection operations 412 may, in response to determining the access terminal 400 to be at least substantially stationary, reduce a frequency (compared to conventional parameters) at which cell reselection procedures are conducted.

In one example, the processing circuit 402 may be adapted to evaluate a signal quality associated with the serving cell at a reduced frequency. For instance, the processing circuit 402 may operate in a discontinuous reception mode (e.g., DRX) where the processing circuit 402 monitors a paging channel (PCH) in a slotted cycle to improve the stand-by time of the power source. At the beginning of each slot cycle, the processing circuit 402 wakes up, reacquires the serving cell, and reads its paging channel (PCH). In at least some examples, when the access terminal 400 is determined to be at least substantially stationary, the processing circuit 402 executing the idle mode cell reselection operations 412 may employ a slot cycle that enables the processing circuit 402 to analyze the paging channel (PCH) less often.

In another example, the processing circuit 402 may be adapted to search possible base station channels for cell reselection at a reduced frequency. The processing circuit 402 can be generally adapted to periodically search for better cells to ensure it is camped on the most appropriate cell of the network. Such a search may include measuring one or more signal parameters for each neighbor cell. Each neighbor cell measurement consumes battery power. Accordingly, the processing circuit 402 executing the idle mode cell reselection operations 412 may perform the periodic search for better cells at a reduced frequency when the access terminal 400 is at least substantially stationary, compared to when the access terminal 400 is mobile. By searching for better cell less often, the processing circuit 402 executing the idle mode cell reselection operations 412 can reduce battery consumption.

Among one or more other benefits, the various aspects and features described herein may facilitate a reduction in cell reselections and a reduction in processes leading to cell reselections in stationary access terminals. Such reductions may provide power savings and increased life of a power source for the access terminal between charges, among other advantages.

While the above discussed aspects, arrangements, and embodiments are discussed with specific details and particularity, one or more of the components, steps, features and/or functions illustrated in FIGS. 1, 2, 3, 4 and/or 5 may be rearranged and/or combined into a single component, step, feature or function or embodied in several components, steps, or functions. Additional elements, components, steps, and/or functions may also be added or not utilized without departing from the invention. The apparatus, devices, parameters and/or components illustrated in FIGS. 1, 2 and/or 4 may be configured to perform one or more of the methods, features, or steps described in FIGS. 3 and/or 5. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The terms "machine-readable medium", "computer-readable medium", and/or "processor-readable medium" may include, but are not limited to, portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising: a communications interface; a storage medium; and
   a processing circuit coupled to the communications interface and the storage medium, the processing circuit adapted to:
   employ one or more mobile thresholds to determine whether to perform cell reselection when the access terminal is mobile; and
   employ one or more stationary threshold to determine whether to perform cell reselection when the access terminal is at least substantially stationary, wherein the one or more stationary thresholds are selected from a group of stationary thresholds consisting of a reduced threshold value for a level of signal quality associated with a serving cell that will trigger signal measurements of one or more other cells for cell reselection, and an increased threshold value for an amount by which a quality of a new cell is to be better than a quality of a serving cell before a reselection to the new cell is performed.

2. The access terminal of claim 1, wherein the processing circuit is further adapted to determine whether the access terminal is mobile or at least substantially stationary.

3. The access terminal of claim 2, wherein the processing circuit is adapted to determine whether the access terminal is mobile or at least substantially stationary from a mobility type data pre-provisioned in the storage medium.

4. The access terminal of claim 2, wherein the processing circuit is adapted to determine the access terminal to be at least substantially stationary when the access terminal has not reselected to a new cell over a predetermined period of time.

5. The access terminal of claim 2, wherein the processing circuit is adapted to determine the access terminal to be at least substantially stationary when previous cell reselections have been limited to reselections between a common group of cells.

6. The access terminal of claim 2, wherein the processing circuit is adapted to determine the access terminal to be at least substantially stationary when a relative signal strength for one or more neighboring cells remains at least substantially the same for a predetermined duration of time.

7. The access terminal of claim 2, wherein the processing circuit is adapted to determine the access terminal to be at least substantially stationary when a GPS location for the access terminal remains at least substantially the same for a predetermined period of time.

8. The access terminal of claim 1, wherein the processing circuit is further adapted to:
conduct one or more cell reselection procedures at a reduced frequency when the access terminal is at least substantially stationary.

9. A method operational at an access terminal, comprising:
determining the access terminal to be at least substantially stationary; and in response to determining that the access terminal is at least substantially stationary,
employing one or more stationary thresholds to determine whether to perform a cell reselection,
wherein the one or more stationary thresholds are selected from a group of stationary thresholds consisting of
a reduced threshold value for a level of signal quality associated with a serving cell that will trigger signal measurements of one or more other cells for cell reselection; and
an increased threshold value for an amount by which a quality of a new cell is to be better than a quality of a serving cell before a reselection to the new cell is conducted.

10. The method of claim 9, wherein determining the access terminal to be at least substantially stationary comprises:
obtaining a mobility type indicating that the access terminal is at least substantially stationary from pre-provisioned data stored in a storage medium.

11. The method of claim 9, wherein determining the access terminal to be at least substantially stationary comprises at least one of:
determining that the access terminal has not reselected to a new cell over a predetermined period of time; or
determining that previous cell reselections have been limited to reselections between a common group of cells.

12. The method of claim 9, wherein determining the access terminal to be at least substantially stationary comprises:
monitoring a relative pilot signal strength for each of a plurality of neighboring cells over a predetermined period of time; and
determining any change in the relative pilot signal strength for one or more neighboring cells to be below a predefined threshold.

13. The method of claim 9, wherein determining the access terminal to be at least substantially stationary comprises:
monitoring a GPS location for a predetermined period of time; and
determining any change in the GPS location over the predetermined period of time to be less than a predefined threshold.

14. The method of claim 9, further comprising:
conducting one or more cell reselection procedures at a reduced frequency in response to determining that the access terminal is at least substantially stationary.

15. The method of claim 14, wherein conducting one or more cell reselection procedures at a reduced frequency comprises:
evaluating a signal quality associated with a serving cell at a reduced frequency.

16. The method of claim 14, wherein conducting one or more cell reselection procedures at a reduced frequency comprises:
analyzing a signal associated with one or more other cells at a reduced frequency.

17. The method of claim 9, further comprising:
employing one or more mobile thresholds to determine whether to perform cell reselection when the access terminal is mobile.

18. An access terminal, comprising:
means for determining the access terminal to be at least substantially stationary; and means for employing one or more stationary thresholds to determine whether to perform a cell reselection following a determination that the access terminal is at least substantially stationary,
wherein the one or more stationary thresholds for determining whether to perform a cell reselection are selected from a group of stationary thresholds consisting of
a reduced threshold value for a level of signal quality associated with a serving cell that will trigger signal measurements of one or more other cells for cell reselection; and
an increased threshold value for an amount by which a quality of a new cell is to be better than a quality of a serving cell before a reselection to the new cell is performed.

19. The access terminal of claim 18, further comprising:
means for conducting one or more cell reselection procedures at a reduced frequency following a determination that the access terminal is at least substantially stationary.

20. A non-transitory processor-readable medium comprising programming operational on an access terminal, which when executed by a processor, causes the processor to:
employ one or more mobile thresholds to determine whether to perform cell reselection when the access terminal is mobile; and
employ one or more stationary threshold to determine whether to perform cell reselection when the access terminal is at least substantially stationary, wherein the one or more stationary thresholds for determining whether to perform a cell reselection comprise:
a reduced threshold value for a level of signal quality associated with a serving cell that will trigger signal measurements of one or more other cells for cell reselection; and
an increased threshold value for an amount by which a quality of a new cell is to be better than a quality of a serving cell before a reselection to the new cell is performed.

21. The non-transitory processor-readable medium of claim 20, further comprising programming, which when executed by the processor, causes the processor to:
determine whether the access terminal is mobile or at least substantially stationary.

22. The non-transitory processor-readable medium of claim 20, further comprising programming, which when executed by the processor, causes the processor to:
conduct one or more cell reselection procedures at a reduced frequency when the access terminal is at least substantially stationary.

* * * * *